United States Patent
Zhou et al.

(10) Patent No.: US 8,335,795 B2
(45) Date of Patent: Dec. 18, 2012

(54) DATA STORING SYSTEM AND DATA PROCESSING METHOD OF INFORMATIONAL HOUSEHOLD APPLIANCE

(75) Inventors: Jianming Zhou, Beijing (CN); Congxing Ouyang, Beijing (CN); Guanghai Zhang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 213 days.

(21) Appl. No.: 12/600,437

(22) PCT Filed: Jun. 29, 2007

(86) PCT No.: PCT/CN2007/002043
§ 371 (c)(1), (2), (4) Date: Nov. 16, 2009

(87) PCT Pub. No.: WO2009/003310
PCT Pub. Date: Jan. 8, 2009

(65) Prior Publication Data
US 2010/0153437 A1  Jun. 17, 2010

(51) Int. Cl.
*G06F 7/00* (2006.01)
*G06F 17/30* (2006.01)
(52) U.S. Cl. ...................................................... 707/769
(58) Field of Classification Search .................... 707/769
See application file for complete search history.

(56) References Cited

U.S. PATENT DOCUMENTS

| 7,237,029 | B2 * | 6/2007 | Hino et al. ..................... 709/227 |
| 7,363,031 | B1 * | 4/2008 | Aisa .............................. 455/419 |
| 2002/0023004 | A1 * | 2/2002 | Hollander et al. .............. 705/22 |
| 2002/0033760 | A1 * | 3/2002 | Kobayashi ............... 340/825.52 |
| 2002/0069276 | A1 * | 6/2002 | Hino et al. ..................... 709/223 |
| 2003/0100962 | A1 * | 5/2003 | Sumita et al. ................... 700/65 |
| 2007/0245409 | A1 * | 10/2007 | Harris et al. ...................... 726/5 |
| 2009/0213808 | A1 * | 8/2009 | Boehm et al. ................. 370/331 |

FOREIGN PATENT DOCUMENTS

| CN | 1514672 A | 7/2004 |
| CN | 1606282 A | 4/2005 |
| CN | 101056197 A | 10/2007 |

* cited by examiner

*Primary Examiner* — Kimberly Wilson
*Assistant Examiner* — Nicholas Allen
(74) *Attorney, Agent, or Firm* — Workman Nydegger (57) ABSTRACT

A data storing system and data processing method of the informational household appliance are provided. The system includes: one or plurality of home database server of informational household appliance which connected with each other, one or plurality of household gateway server, and one or plurality of data managing server of informational household appliance. The data processing method includes: the data processing method of the informational household appliance on-lining, off-lining and status data updating thereof, and the current status of informational household appliance in real-time reflects to the data managing server of informational household appliance through the household gateway server by this data processing method. The data of the informational household appliance can be stored separately from the informational household appliance, and the data of the informational household appliance can be unitedly managed by the system and method.

15 Claims, 4 Drawing Sheets

DATA STORING SYSTEM AND DATA PROCESSING METHOD OF INFORMATIONAL HOUSEHOLD APPLIANCE

FIELD OF THE INVENTION

The present invention relates to a data storing system and a data processing method, and in particular to a data processing method and a data storing system in which data of an informational household appliance is stored in a server in a network and current status of the informational household appliance is reflected in real-time to a data managing server of informational household appliance through a household gateway server.

BACKGROUND OF THE INVENTION

With the development of network technology and household appliance industry, household appliances can now be connected to a network. This type of household appliances is called informational household appliances, or network household appliances. An informational household appliance can receive data from a network as well as feed its status information back to the network. An informational household appliance allows a user to obtain data of the informational household appliance located at home via the Internet, and thus enables the user to know status of the informational household appliance without being at home.

Two ways are available for storing data of an informational household appliance.

1. Data of the informational household appliance is stored in the informational household appliance itself. When a server or a terminal in a network is to obtain the data of the informational household appliance, the server or the terminal accesses the informational household appliance in a peer-to-peer (P2P) mode to obtain the data. In the P2P mode, the server or the terminal in the network may establish a direct communication link to the informational household appliance and obtain the data of the informational household appliance by directly accessing the informational household appliance. Therefore, all data of the informational household appliance are stored in the informational household appliance itself, which requires the informational household appliance to have great data storing and processing capability. However, currently a great variety of informational household appliances are available with big differences in their respective modes of data storing and communication, thus it is difficult to obtain data of all kinds of informational household appliances. Further, with said P2P mode, unified management on data of large amount of informational household appliances is not available, to manage and utilize household issues are not convenient for the user, and to manage and operate household services are not convenient for service providers.

2. An informational household appliance is connected to a web server via a gateway and transmits its data to the web server so as to provide the data to other servers or terminals in the network. A user obtains data of an informational household appliance located at home by accessing a web page and further manages the informational household appliance by accessing a web page. This way makes good use of existing Internet resources. However, network communication based on web page accessing is not in real time. Therefore, data of an informational household appliance updated by the web server can only be viewed when the user accesses the corresponding web page, hence the communication lacks time efficiency. Furthermore, a lot of page information (such as the font) needs to be transferred by the way of web page accessing, thus large amount of data is transferred during information exchange process. Still further, a mobile terminal is required to have capability of processing and displaying a web page. However, widely used mobile terminals are not suitable for web page accessing because of the limit of features of the mobile terminals themselves and relevant communication means, which makes it difficult for a user to use a mobile terminal to control and manage an informational household appliance. Additionally, by the way of web accessing, a network accessing mode of normal computers is employed, in which mode an informational household appliance is identified based on IP, while an IP address is frequently changed, hence the data of an informational household appliance still needs to be stored in the informational household appliance itself, and it is difficult for a web server to manage and update the data of the informational household appliance.

SUMMARY

An object of the present invention is to provide a data storing system of an informational household appliance. With the system, data of the informational household appliance is stored in a network by configuring a home database server of informational household appliance and a data managing server of informational household appliance, so that the data of the informational household appliance needs not to be stored in the informational household appliance itself, thus achieving unified management of data of the informational household appliance, and facilitating a server or a terminal in the network to obtain data of the informational household appliance and control the informational household appliance based on the data.

Another object of the present invention is to provide a data processing method of an informational household appliance, in which an on-line message including identification code of the informational household appliance is reported to notify a data managing server of informational household appliance that the informational household appliance is linked on-line, and static data of the informational household appliance is obtained thereby implementing real-time management of data of the informational household appliance by the server when the informational household appliance is on-line.

To achieve the above objects of the present invention, an embodiment of the present invention provides a data storing system of an informational household appliance, including:

one or more home database servers of informational household appliance linked to each other, one or more household gateway servers, and one or more data managing servers of informational household appliance;

the home database server of informational household appliance is for storing static data of the informational household appliance including at least an identification code of the informational household appliance;

the household gateway server is for monitoring status of an informational household appliance linked to the household gateway server in real time;

the data managing server of informational household appliance is for storing operation data of an informational household appliance in operation, the operation data includes at least static data and operation status data of the informational household appliance and address information of a household gateway server corresponding to the informational household appliance.

An embodiment of the present invention provides a data processing method of an informational household appliance including:

Process 11, sending an identification code of an informational household appliance to a household gateway server when the informational household appliance is linked to the household gateway server;

Process 12, sending an on-line message including the identification code, by the household gateway server, to a data managing server of informational household appliance;

Process 13, upon receiving the on-line message, extracting, by the data managing server of informational household appliance, the identification code from the on-line message;

Process 14, based on the identification code, querying, by the data managing server of informational household appliance, a home database server of informational household appliance for the informational household appliance, and obtaining static data of the informational household appliance from the home database server of informational household appliance;

Process 15, storing, by the data managing server of informational household appliance, the static data;

Process 16, sending, by the data managing server of informational household appliance, the static data to the household gateway server;

Process 17, storing, by the household gateway server, the static data of the informational household appliance The present invention has the following advantages:

1. Data of an informational household appliance is not necessary to be stored in the information household appliance itself, and unified management of data of informational household appliances is achieved.

2. A user can conveniently obtain data of an informational household appliance in which the user can conveniently obtain the data of the informational household appliance from an data managing server of informational household appliance through a mobile terminal.

3. Requirement on storing and processing capability of an informational household appliance itself is reduced.

4. It is helpful for a carrier to manage and operate household network services, and more extensive scope of services is possible.

The present invention is further described in detail with reference to the drawings and embodiments below.

DETAILED DESCRIPTION OF THE EMBODIMENTS

Figure 1:
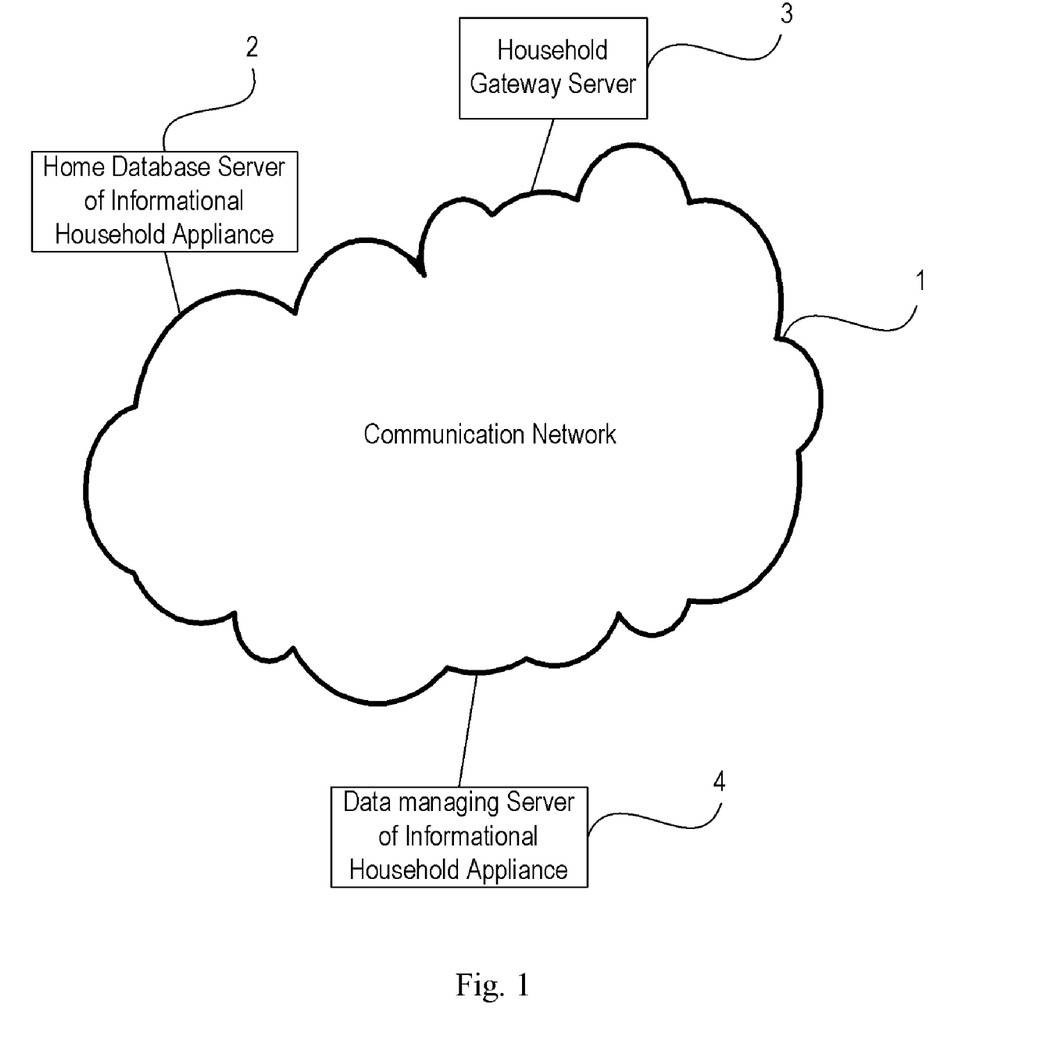
FIG. 1 is a block diagram of a data storing system of an informational household appliance according to an embodiment of the present invention.

FIG. 1 is a block diagram of a data storing system of an informational household appliance according to an embodiment of the present invention. The data storing system includes:

a communication network 1 that can be an IP based communication network in practice; one or more home database servers of informational household appliance 2 linked to the communication network 1 for storing static data of the informational household appliance, the static data is data associated with the informational household appliance and generated when the informational household appliance is manufactured and not able to be modified with the usage of the informational household appliance and including at least an identification code of the informational household appliance; one or more household gateway servers 3 linked to the communication network 1 for monitoring status of an informational household appliance linked to it in real time; one or more data managing servers of informational household appliance 4 linked to the communication network 1 for storing operation data of an informational household appliance in operation, the operation data includes at least static data of the informational household appliance in operation and current operation status data of the informational household appliance in operation, as well as address information of the household gateway server linked to the informational household appliance in operation.

In this embodiment of the present invention, the data storing mode of person-to-person communication is introduced into data storage of an informational household appliance. While an informational household appliance is manufactured, the manufacturer shall allocate a code to it. The code shall be in accordance with a standard format and able to global-uniquely identify the informational household appliance and is referred to as an ID of the informational household appliance. With the ID, a home database server of informational household appliance of the informational household appliance can be addressed. The ID code of the informational household appliance is stored in both the informational household appliance and the home database server of informational household appliance. Furthermore, the manufacturer also provides other static data of the informational household appliance including device brand, device name, device model, manufacturing serial number, default configuration information of the device, control instruction set supported by the device, etc. The static data are stored in the home database server of informational household appliance of the informational household appliance while the informational household appliance is manufactured. In the prior art, such static data is stored in the informational household appliance itself, but in embodiments of the present invention, the static data is not necessary to be stored in the informational household appliance, thus the amount of data to be stored in the informational household appliance is reduced. If there are multiple home database servers of informational household appliance, these servers can be classified in different ways. For example, the servers can be classified according to manufacturer of the informational household appliances or according to categories of the informational household appliances. Accordingly, the ID code of an informational household appliance can be encoded in the same way, so that which home database server of informational household appliance the informational household appliance belongs to can be identified by analyzing the ID code of the informational household appliance.

A data managing server of informational household appliance manages one or more household gateway servers, and a household gateway server manages all informational household appliances in a home. The data managing server of informational household appliance stores operation data of all informational household appliances in operation managed by it. Furthermore, in the data managing server of informational household appliance, operation data of informational household appliances is organized based on each household gateway server. In the embodiment of the present invention, any informational household appliance can be linked to the household gateway server. One home can be set with one household gateway server, and all informational household appliances in the home can be linked to the household gateway server, so that the household gateway server manages all the informational household appliances in the home in a united way and monitors status of each informational household appliance in real time. The household gateway server stores operation data of all informational household appliances in operation in the home, and synchronizes with the operation data of the informational household appliances stored in the data managing server of informational household appliance. Therefore, informational household appliances can be conveniently managed via the household gateway server in the home. On the other hand, when delinked from an external network, the household gateway server can store operation data of the informational household appliances, and update the operation data stored in the data managing server of informational household appliance when the network link is restored.

The data managing server of informational household appliance and the household gateway server only store operation data of an informational household appliance in operation. When an informational household appliance is newly linked to the household gateway server, the informational household appliance sends its ID to the data managing server of informational household appliance through the household gateway server. The data managing server of informational household appliance obtains static data of the informational household appliance from a home database server of informational household appliance of the informational household appliance according to the ID of the information household appliance. The static data is stored in both the data managing server of informational household appliance and the household gateway server.

Since the data managing server of informational household appliance stores operation data of all informational household appliances currently in operation, other servers or terminals in the network can obtain the operation data of the informational household appliances currently in operation from the data managing server of informational household appliance. A plurality of methods are available for obtaining the operation data, such as traditional method based on web page accessing, and instant message communication method. The above data storing method has great advantage over conventional technology. In practical application, the instant message communication method may be employed, and accordingly the data managing server of informational household appliance also manages subscription information of informational household appliance events subscribed by instant communication users. The informational household appliance events refer to changes of status of an informational household appliance, such as on-line, off-line, and update of operation status data. When an informational household appliance event occurs, the data managing server of informational household appliance notifies terminals of instant communication users who have subscribed to this informational household appliance event and sends relevant data to the terminals of the instant communication users. This method is particularly fits for widely used mobile terminals. The subscription to the informational household appliance events is not oriented to an informational household appliance, but to the household gateway server. In the embodiment of the present invention, one household gateway server corresponds to one home, and the subscription to the informational household appliance events is oriented to the collection of all informational household appliances in the home, which means that an information household appliance on-line event is the on-line event of any informational household appliance in the home being linked on-line. If a mobile terminal subscribes to an informational household appliance event, when this informational household appliance event occurs, the data managing server of informational household appliance can be informed of the occurrence of this information household appliance event by information exchange between servers. Based on stored subscriber information, the data managing server of informational household appliance notifies the mobile terminals of the subscribers about the informational household appliance event in time. This method does not need a user to obtain the information. Such on-line status management for informational household appliances and instant communication can not be achieved with existing data storing methods for informational household appliances. Furthermore, a subscriber in the embodiment of the present invention can be a server in the network rather than a normal user. For example, a home database server of informational household appliance can be a subscriber. When an informational household appliance event occurs, the event can be reported to the home database server of informational household appliance. Since the home database server of informational household appliance is closely related to manufacturers of informational household appliances, this instant communication method makes the manufacturers to timely aware of status of the informational household appliances manufactured by them.

Figure 2:
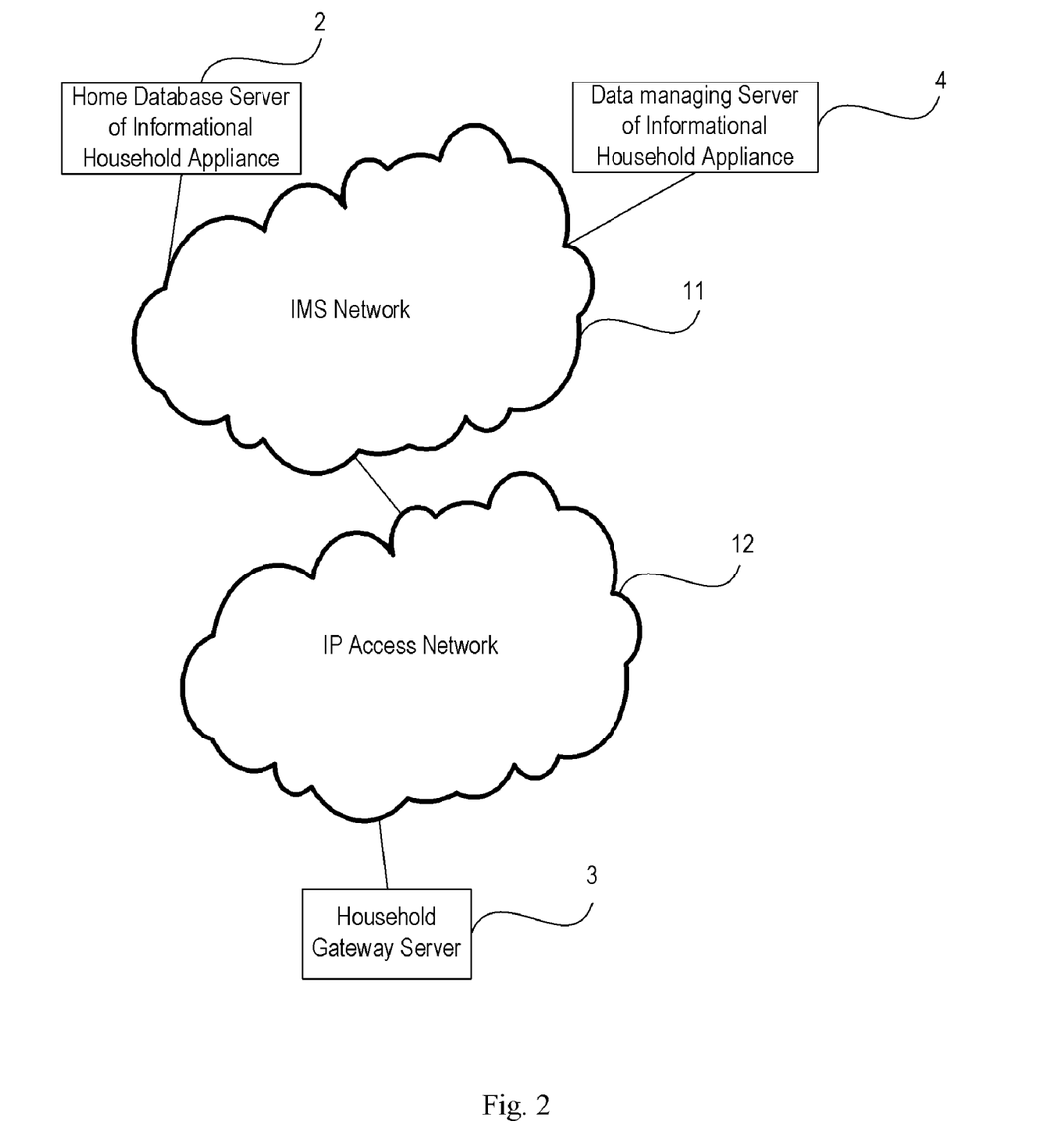
FIG. 2 is a block diagram of a data storing system of an informational household appliance according to another embodiment of the present invention.

FIG. 2 is a block diagram of a data storing system of an informational household appliance according to another embodiment of the present invention. In this embodiment, a communication network 1 includes an IP multimedia subsystem (IMS) network 11 and an IP access network 12 linked to each other. A home database server of informational household appliance 2 and a data managing server of informational household appliance 4 are linked to the IMS network 11. A household gateway server 3 is linked to the IP access network 12. The advantage of instant communication is better utilized with the IMS network.

Figure 3:
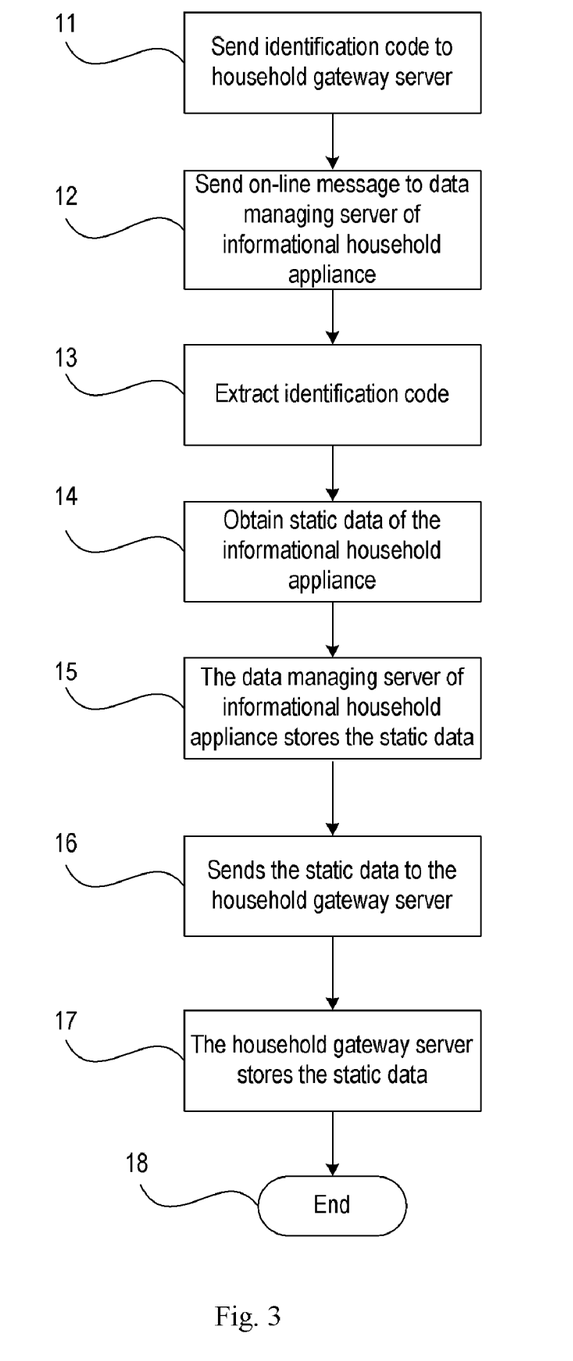
FIG. 3 is a flowchart of a data processing method of an informational household appliance on-lining according to an embodiment of the present invention.

FIG. 3 is a flowchart of a data processing method of an informational household appliance on-lining according to an embodiment of the present invention. The method includes:

Process 11, sending an identification code of an informational household appliance to a household gateway server when the informational household appliance is linked to the household gateway server. The informational household appliance in this embodiment of the present invention stores its ID code. When the linking status between the informational household appliance and the household gateway server is switched from delinked to linked, the informational household appliance sends its ID code to the household gateway server;

Process 12, the household gateway server sends an on-line message including the identification code to a data managing server of informational household appliance;

Process 13, upon receiving the on-line message, the data managing server of informational household appliance extracts the identification code from the on-line message;

Process 14, based on the identification code, the data managing server of informational household appliance queries a home database server of informational household appliance of the informational household appliance and obtains static data of the informational household appliance from the home database server of informational household appliance;

Process 15, the data managing server of informational household appliance stores the static data;

Process 16, the data managing server of informational household appliance sends the static data to the household gateway server;

Process 17, the household gateway server stores the static data of the informational household appliance;

Process 18, end.

If a subscriber has subscribed to an informational household appliance on-line event, the data managing server of informational household appliance stores information of the subscriber that has subscribed to the informational household appliance on-line event corresponding to the household gateway server, then in process 13, after extracting the identification code, the method further includes: the data managing server of informational household appliance sends an on-line event message to a subscription device of the subscriber to report that the informational household appliance is linked on-line according to the stored information of the subscriber that subscribes to the informational household appliance on-line event corresponding to the household gateway server. The on-line event message includes the ID code of the informational appliance. For example, the subscriber can be a mobile phone user, if an informational household appliance in the home of the user is linked on-line, the mobile phone (i.e subscription device) of the user may receive a message about the on-line event of this informational household appliance. The on-line event message may only include the ID and an on-line status indicator of the informational household appliance. The subscription device needs to have static data of the informational household appliance (for example, a control instruction set supported by the informational household appliance) stored there on in order to identify the event message of the informational household appliance. Many methods are available for the subscription device corresponding to the subscriber to obtain the static data of the informational household appliance. For example, the static data of the informational household appliance can be obtained from the home database server of informational household appliance through the data managing server of informational household appliance, or the static data can be pushed to the subscription device corresponding to the subscriber by the data managing server of informational household appliance on its initiative when the informational household appliance on-line event occurs. Hence, in process 14, after the data managing server of informational household appliance obtains the static data of the informational household appliance, the method may further include: sending an on-line event message including the identification code and the static data of the informational household appliance to the subscription device corresponding to the subscriber.

The home database server of informational household appliance is closely related to manufacturers of informational household appliances. The home database server of informational household appliance may also be a subscriber, so that the manufacturers can monitor the usage of the informational household appliances. In such a case, since the home database server of informational household appliance has already stored with it the static data of the informational household appliances, in process 14, before sending the on-line event message including the identification code and the static data of the informational household appliance to the subscription device corresponding to the subscriber, the method may further include: judging whether or not the subscription device is the home database server of informational household appliance, if yes, sending the on-line event message to the home database server of informational household appliance; otherwise, sending the on-line event message including the identification code and the static data of the informational household appliance to the subscription device corresponding to the subscriber.

Furthermore, the household gateway server and the data managing server of informational household appliance have stored with them operation data of informational household appliances currently in operation. The stored operation data should be synchronized, that is, operation data of an informational household appliance is deleted from the household gateway server and the data managing server of informational household appliance when the informational household appliance switches from operation to not-operation. In practice, the detection of operation state of an informational household appliance is implemented by monitoring the informational household appliance in the home in real time by the household gateway server. There are many reasons that can cause an informational household appliance to be delinked from the household gateway server, sometimes the reason may be temporary disconnection. Therefore, upon detecting an informational household appliance delinked there from, the household gateway server and the data managing server of informational household appliance may delete corresponding data with a delayed time interval. Accordingly, between Process 13 and Process 14, the method may further include: Process 13a, checking whether or not the identification code of the informational household appliance is stored in the data managing server of informational household appliance, if yes, execute Process 18, otherwise, execute Process 14. Correspondingly, in the case that the data managing server of informational household appliance stores information of a subscriber who subscribes to the informational household appliance on-line event corresponding to the household gateway server, then in Process 13a, if the data managing server of informational household appliance stores the identification code of the informational household appliance, the data managing server of informational household appliance sends an on-line event message to the subscription device corresponding to the subscriber, and then execute Process 18; if the data managing server of informational household appliance does not store the identification code of the informational household appliance, in Process 14, after obtaining the static data of the informational household appliance, the data managing server of informational household appliance sends an on-line event message and the static data of the informational household appliance to the subscription device corresponding to the subscriber. Additionally, Process 14 may further include a process of judging whether the subscription device is the home database server of informational household appliance, if yes, the on-line event message is sent to the home database server of informational household appliance, otherwise, the on-line event message and the static data of the informational household appliance are sent to the subscription device corresponding to the subscriber.

Figure 4:
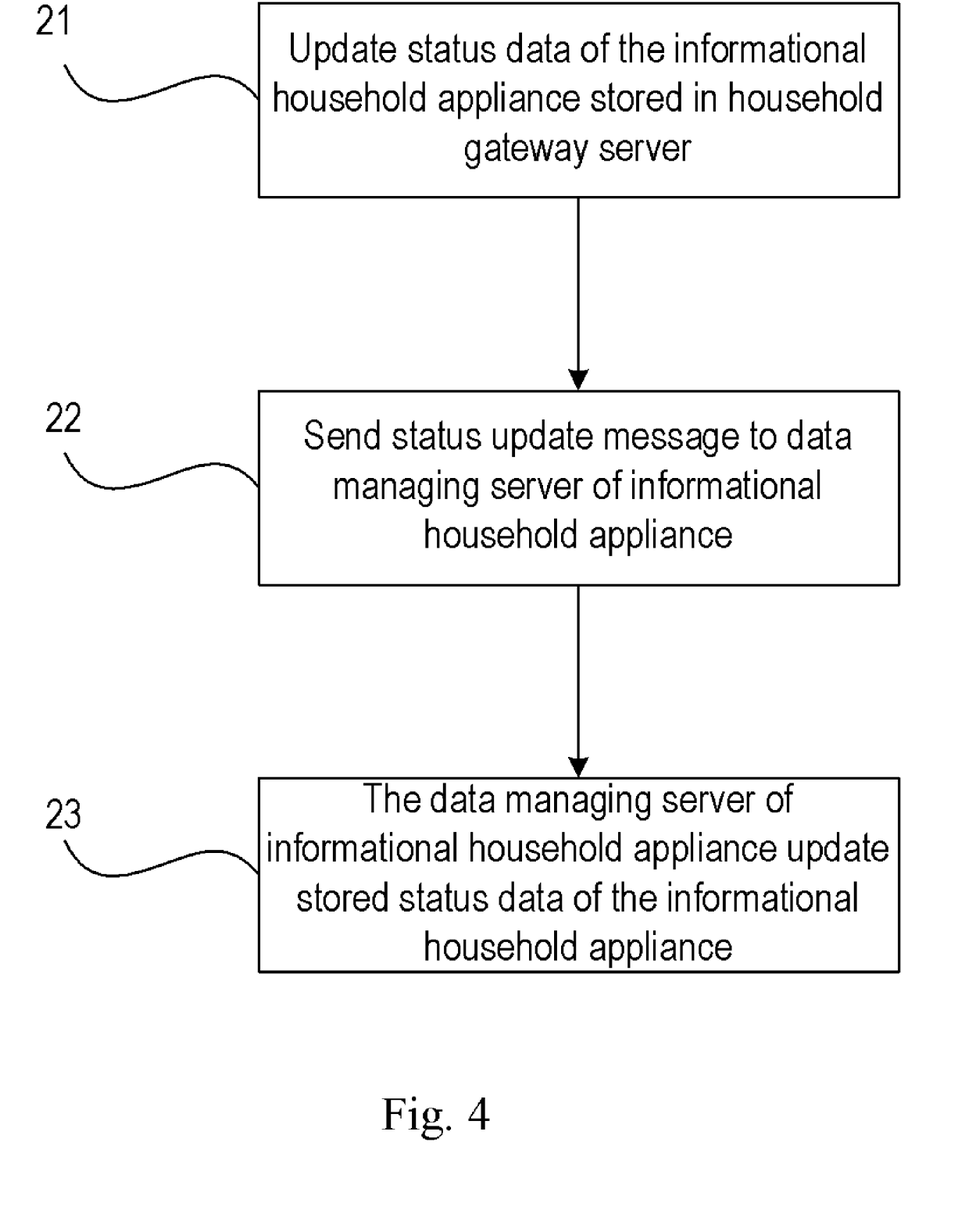
FIG. 4 is a flowchart of a data processing method for updating status data of an informational household appliance according to an embodiment of the present invention.

FIG. 4 is a flowchart of a data processing method for updating operation status data of an informational household appliance according to an embodiment of the present invention. The method includes:

Process 21, a household gateway server monitors status of an informational household appliance in real time and updates status data of the informational household appliance stored in the household gateway server according to detected change of status of the informational household appliance;

Process 22, the household gateway server sends an status update message including the updated status data and an identification code of the informational household appliance to a data managing server of informational household appliance;

Process 23, the data managing server of informational household appliance updates stored status data of the informational household appliance according to the updated status data.

If a subscriber has subscribed to an operation status data update event, the data managing server of informational household appliance has stored with it the information of the subscriber who has subscribed to the informational household appliance operation status data update event corresponding to the household gateway server. Accordingly, after Process 23, the method may further include: the data managing server of informational household appliance sending an operation status data update event message including the updated operation status data and the identification code of the informational household appliance to the subscription device corresponding to the subscriber according to the stored information of the subscriber who has subscribed to the informational household appliance operation status data update event corresponding to the household gateway server.

When an informational household appliance switches itself off, or is delinked from the household gateway server for some reasons, the informational household appliance is considered off-line. The household gateway server monitors linking status of informational household appliances in real time and sends an off-line message of an informational household appliance to the data managing server of informational household appliance upon detecting that the informational household appliance is delinked from the household gateway server.

Since the household gateway server and the data managing server of informational household appliance only store operation data of an informational household appliance in operation, when an informational household appliance is off-line, the operation data of this informational household appliance shall be deleted. Because there are many reasons that can cause an informational household appliance to be delinked from the household gateway server, such as a temporary network disconnection, after the household gateway server detects that the informational household appliance is delinked from the household gateway server, it deletes the operation data of the informational household appliance stored in it if it does not detect the re-link of the informational household appliance within a set time period. And after the data managing server of informational household appliance receives the off-line message, and within a set time period, does not receive any operation status data update message or on-line message of the informational household appliance, it deletes the operation data of the informational household appliance stored therein.

Furthermore, if a subscriber subscribes to an off-line event, the data managing server of informational household appliance has stored with it information of the subscriber who has subscribed to the informational household appliance off-line event corresponding to the household gateway server. Upon receiving the off-line message, the data managing server of informational household appliance sends an off-line event message to the subscription device corresponding to the subscriber to notify the subscriber of the off-line status of the informational household appliance.

It should be stated that the above embodiments are only to illustrate but not limit the technical solution of the present invention. Though the present invention has been elaborately described with reference to the preferred embodiments, it should be understood by one skilled in the art that it is still possible to modify the technical solutions described in the above embodiments, or replace part of the technical features with equivalent ones without departing from the spirit and scope of the present invention.

What is claimed is:

1. A data storing system of an informational household appliance comprising:
   one or more home database servers of informational household appliance linked with each other, one or more household gateway servers, and one or more data managing servers of informational household appliance;
   the home database server of informational household appliance is for storing static data of the informational household appliance including at least an identification code of the informational household appliance;
   the household gateway server is for monitoring status of an informational household appliance linked to the household gateway server in real time and storing operation data of an informational household appliance in operation; and
   the data managing server of informational household appliance is for managing one or more household gateway servers, storing the operation data of the informational household appliance in operation including at least static data of the informational household appliance, operation status data of the informational household appliance, and address information of a household gateway server corresponding to the informational household appliance, and managing subscription information of informational household appliance events subscribed by instant communication users.

2. The data storing system of claim 1, wherein, the home database server of informational household appliance, the household gateway server and the data managing server of informational household appliance are linked to each other through a communication network.

3. The data storing system of claim 2, wherein, the communication network comprises an IP multimedia subsystem network and an IP access network linked to each other; the home database server of informational household appliance and the data managing server of informational household appliance are linked to the IP multimedia subsystem network, and the household gateway server is linked to the IP access network.

4. A data processing method of an informational household appliance by using the data storing system of claim 1, comprising:
   sending the identification code of the informational household appliance to the household gateway server when the informational household appliance is linked to the household gateway server;
   sending, by the household gateway server, an on-line message including the identification code to the data managing server of the informational household appliance;
   extracting, by the data managing server of the informational household appliance, the identification code from the on-line message upon receiving the on-line message;
   querying, by the data managing server of the informational household appliance, the home database server of the informational household appliance based on the identification code and obtaining static data of the informational household appliance from the home database server of informational household appliance;
   storing, by the data managing server of the informational household appliance, the static data;

sending, by the data managing server of the informational household appliance, the static data to the household gateway server; and storing, by the household gateway server, the static data of the informational household appliance.

5. The method of claim 4, wherein, after extracting the identification code from the on-line message upon receiving the on-line message and before querying a home database server of informational household appliance of the informational household appliance of the informational household appliance based on the identification code and obtaining static data of the informational household appliance from the home database server of informational household appliance, the method further comprises:

checking whether or not the identification code is stored in the data managing server of informational household appliance, if yes, terminating the data processing process, otherwise, querying a home database server of informational household appliance of the informational household appliance based on the identification codes and obtaining static data of the informational household appliance from the home database server of the informational household appliance.

6. The method of claim 5, wherein, if the data managing server of informational household appliance stores the information of a subscriber that has subscribed to an informational household appliance on-line event corresponding to the household gateway server, and, if the data managing server of informational household appliance has stored with it the identification code of the informational household appliance, before terminating the data processing process, the method further comprises: the data managing server of informational household appliance sends an on-line event message including the identification code to the subscription device corresponding to the subscriber based on stored information of the subscriber.

7. The method of claim 5, wherein, after the data managing server of informational household appliance obtains the static data of the informational household appliance, the method further comprises:

sending, by the data managing server of informational household appliance, an on-line event message including the identification code and the static data of the informational household appliance to the subscription device corresponding to the subscriber based on the stored information of the subscriber that has subscribed to the informational household appliance on-line event corresponding to the household gateway server.

8. The method of claim 7, wherein, before sending the on-line event message including the identification code and the static data of the informational household appliance to the subscription device corresponding to the subscriber, the method further comprises:

judging whether the subscription device is a home database server of informational household appliance, if yes, sending the on-line event message including the identification code to the home database server of informational household appliance; otherwise, sending the on-line event message including the identification code and the static data of the informational household appliance to the subscription device corresponding to the subscriber.

9. The method of claim 4, wherein, after extracting the identification code, the method further comprises:

sending, by the data managing server of informational household appliance, an on-line event message including the identification code of the informational household appliance to a subscription device corresponding to a subscriber based on stored information of the subscriber that has subscribed to an informational household appliance on-line event corresponding to the household gateway server.

10. The method of claim 4, wherein, after the data managing server of information household appliance obtains the static data of the informational household appliance, the method further comprises:

sending, by the data managing server of informational household appliance, an on-line event message including the identification code and static data of the informational household appliance to a subscription device corresponding to a subscriber based on the stored information of the subscriber that has subscribed to the informational household appliance on-line event corresponding to the household gateway server.

11. The method of claim 10, wherein, before sending the on-line event message including the identification code and the static data of the informational household appliance to the subscription device corresponding to the subscriber, the method further comprises: judging whether or not the subscription device is a home database server of informational household appliance, if yes, sending the on-line event message to the home database server of informational household appliance; otherwise, sending the on-line event message including the identification code and the static data of the informational household appliance to the subscription device corresponding to the subscriber.

12. The method of claim 4, wherein, the method further comprises:

monitoring, by a household gateway server, linking status of an informational household appliance in real time;

sending, by the household gateway server, an off-line message including an identification code of the informational household appliance to a data managing server of informational household appliance upon detecting that the informational household appliance is delinked from the household gateway server.

13. The method of claim 12, wherein, after detecting that the informational household appliance is delinked from the household gateway server, and within a set time period, no recovery of the link of the informational household appliance is detected, the household gateway server deletes the operation data of the informational household appliance stored in it.

14. The method of claim 13, wherein, after receiving the off-line message, and within a set time period, no any operation status data update message or on-line message of the informational household appliance is received, the data managing server of informational household appliance deletes the operation data of the informational household appliance stored in it.

15. The method of claim 12, wherein, after receiving the off-line message, the data managing server of informational household appliance sends an off-line event message including an identification code of the informational household appliance to a subscription device corresponding to a subscriber according to stored information of the subscriber that has subscribed to the informational household appliance off-line event corresponding to the household gateway server.

* * * * *